United States Patent [19]

Johnson

[11] Patent Number: 4,573,728
[45] Date of Patent: Mar. 4, 1986

[54] SNUBBING APPARATUS FOR GRAPPLES AND THE LIKE

[75] Inventor: Thomas E. Johnson, Woodstock, Canada

[73] Assignee: Timberjack Inc., Woodstock, Canada

[21] Appl. No.: 632,503

[22] Filed: Jul. 19, 1984

[51] Int. Cl.⁴ .............................. B66C 1/00; F16F 7/04
[52] U.S. Cl. .................................. 294/119.4; 188/71.1;
188/83; 188/366
[58] Field of Search ................ 294/67 AA, 70, 86 R, 294/88, 106; 37/183 R; 188/71.1, 83, 130, 366, 367, 378; 403/15, 31, 113, 120, 146, 147, 157; 414/626, 732–735, 738–740

[56] References Cited

U.S. PATENT DOCUMENTS

| | | | |
|---|---|---|---|
| 3,301,587 | 1/1967 | Heikkinen | 294/67 AA |
| 3,493,135 | 2/1970 | Novotny | 294/86 R X |
| 3,895,694 | 7/1975 | Muntjanoff | 188/83 |
| 3,937,302 | 2/1976 | Palmcrantz | 188/130 X |
| 4,417,759 | 11/1983 | Pierrot et al. | 294/86 R |

Primary Examiner—Johnny D. Cherry
Attorney, Agent, or Firm—Ridout & Maybee

[57] ABSTRACT

A snubbing device for a suspended grapple or the like operable by pressurized fluid in a cavity between a pin and housing of a universal joint which actuates a ramp to cause a retarding reaction between the pin and housing to prevent free swinging of the grapple.

8 Claims, 3 Drawing Figures

SNUBBING APPARATUS FOR GRAPPLES AND THE LIKE

This invention relates to a snubbing apparatus for the pivotable or swivel mounted support of well-known grapple mechanisms, clam shells, and the like, used for handling loads.

Heretofore, grapple mechanisms were allowed to oscillate freely at the end of a boom assembly of a skidder or construction machine which is undesirable since the load may be long enough, such as pulpwood loads, to damage the machine or the free oscillation of the load makes it difficult to spot the load or the grapple mechanism or the like (see U.S. Pat. Nos. 3,582,127 to Johnson and 3,594,034 to Rowell). Snubbers for grapple mechanisms are known in the art, see U.S. Pat. Nos. 3,592,503 to Lundberg and 3,513,998 to Stone, but such snubbers are costly to manufacture and maintain.

Accordingly, one object of the present invention is to provide a snubber or retarding apparatus for a swivel or universal mounted grapple or the like suspended from the free end of a boom end assembly that is inexpensive to manufacture, requires no adjustment, and is readily maintained.

Another object of the invention is to provide a snubbing apparatus actuated by an elongated sleeve piston which surrounds a pin of the swivel or universal joint and which is pressurized via a grease pin fitting.

Another object of the invention is to provide a snubber for a grapple mechanism or the like suspended from the free end of a boom operable by the pressurized fluid acting on a sleeve piston positioned between the pin and yoke of the swivel or universal joint.

Other objects of this invention will become apparent from the following description and accompanying drawings wherein.

Figure 1:
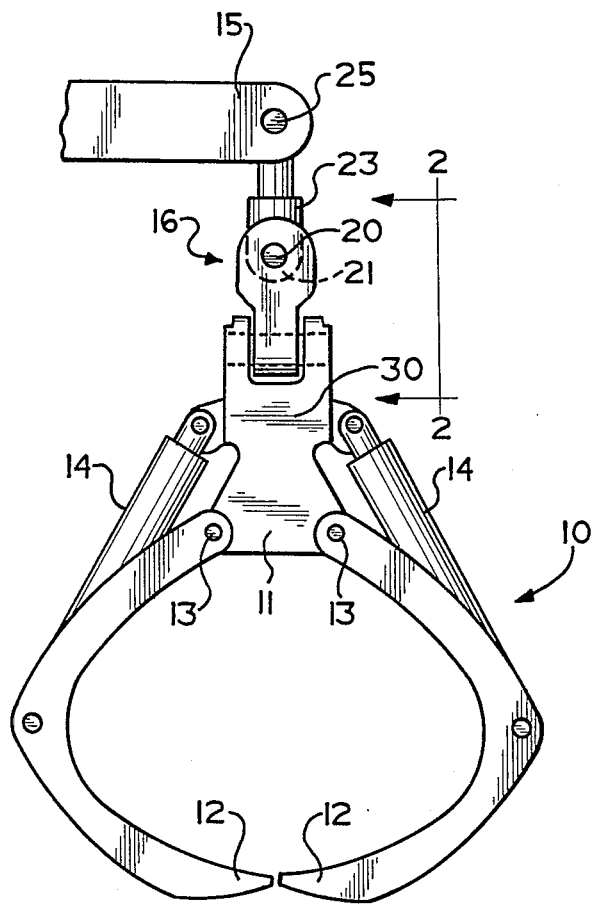
FIG. 1 is a side elevational view illustrating the invention in conjunction with a typical grapple mechanism that is suspended from the free end of a boom which is depicted only fragmentarily.
Figure 2:
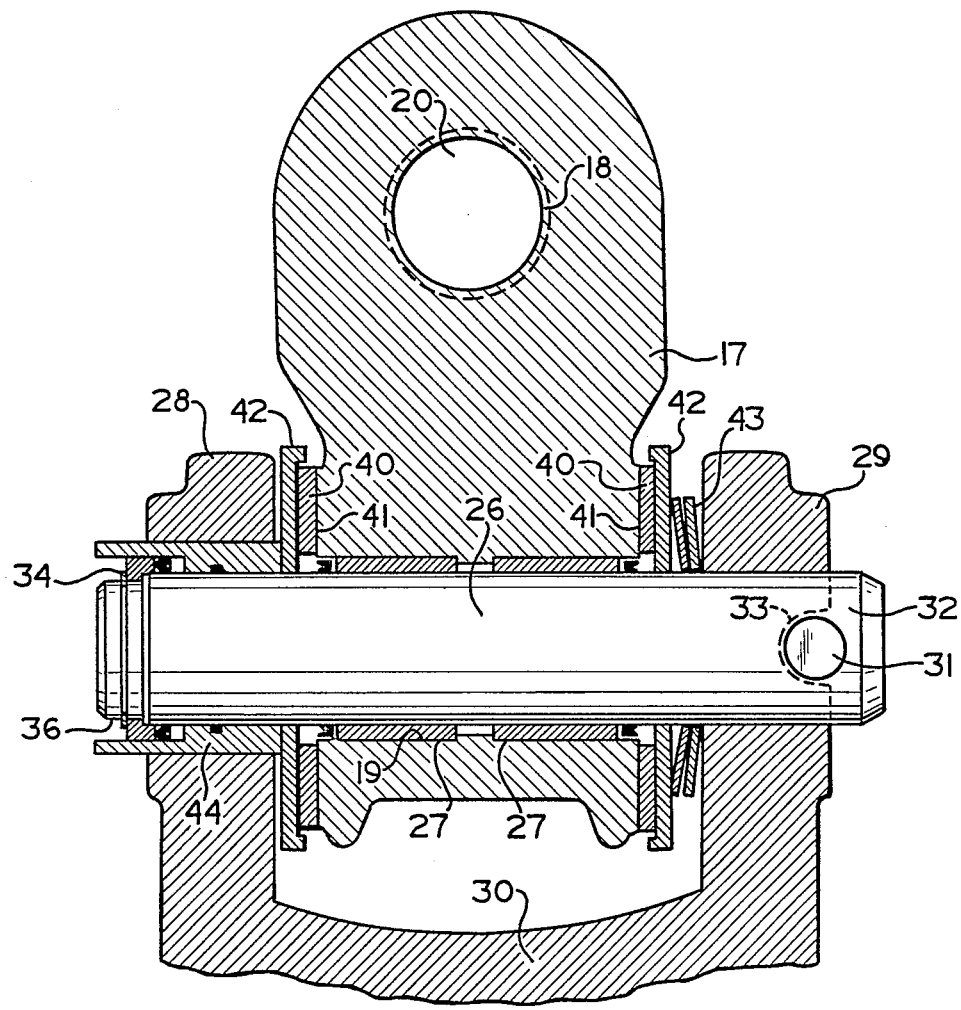
FIG. 2 is a sectional view taken along the lines 2—2 of FIG. 1.

Referring to FIG. 1 of the drawings, a conventional grapple mechanism shown in this Fig. has been denoted generally by the reference numeral 10. The grapple mechanism 10 includes a frame or head 11, a pair of operable jaws 12 pivotably mounted to the head on pins 13. Hydraulic motors (14) in the form of two rams actuate the jaws into open and closed positions about the pivot pins 13. Although this invention is shown and described as applying to a grapple mechanism 10 it is also obvious that the invention can be employed with other mechanisms such as clam buckets, and the like.

The grapple mechanism 10 is suspended from the free end 15 of a boom mounted on a skidder or other machine which is not shown. The grapple 10 is connected to the boom 15 by means of a swivel or universal joint unit embodying my invention which has been denoted generally by reference numeral 16.

The universal joint 16 comprises a bidirectional pivot member 17 having an upper bore 18 and lower bore 19 formed at right angles to each other. A pin 20 passes through the upper bore 18 and pivotably supports the arms 21 of the upper yoke 23 which is pivotably mounted at 25 to the boom 15. The pin 20 has suitable means at each end thereof to prevent the pin 20 from either rotating or moving axially relative to the arms 21. Further, the pin 20 may have a snubber device similar to that described below.

Figure 3:
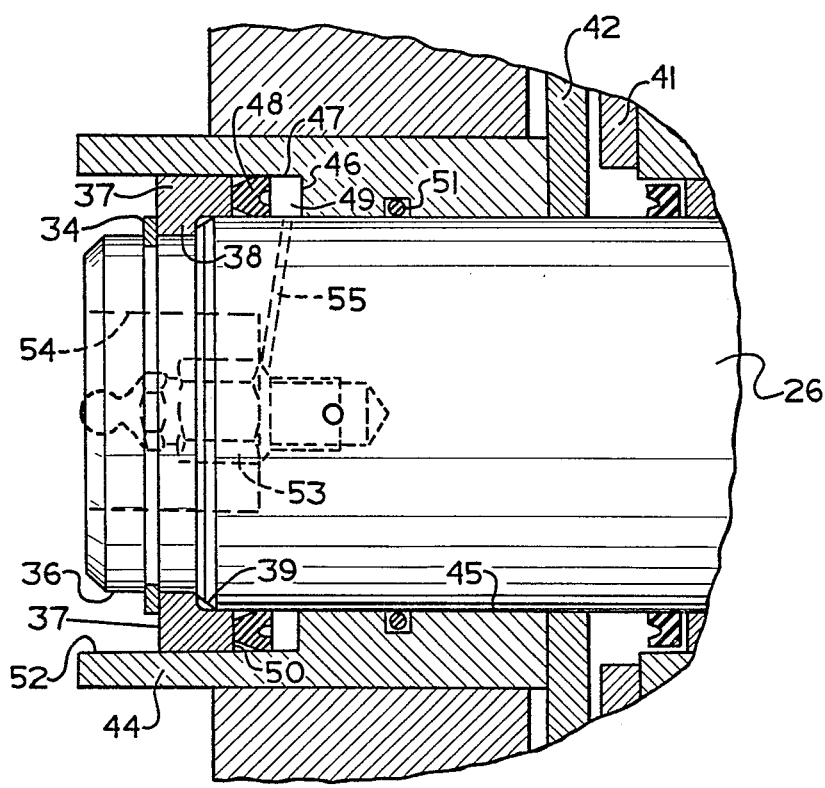
FIG. 3 is an enlarged fragmentary view similar to FIG. 2.

A lower pin 26 is supported within the lower bore 19 by suitable bearings 27 and passes through aligned bores in arms 28 and 29 of the lower yoke 30. A fastener 31 passes through a hole in the pin end 32 and through a groove 33 in the arm 29 to prevent the lower pin 26 from rotating relative to the arms 28 and 29 and to prevent the pin 26 from moving axially inwardly of the arm 29 in a direction toward the pivot member 17. As shown in FIG. 3, a snap-ring 34 positioned within a groove formed in the end 36 of pin 26 bears against a ring bearing 37 having a shoulder 38 which engages a shoulder 39 in the pin end 36 to prevent the pin 26 from moving axially relative to the yoke 30.

Ring shaped brake pads 40 made of suitable friction material are mounted on annular flanges 41 formed in the lower yoke 30. Each of the brake pads 40 is provided with a dish shaped brake pad retainer 42. A pair of bellville spring washers 43 are positioned between the arm 29 and the adjacent brake pad retainer 42.

Referring to FIG. 3, the snubber or retarding apparatus of this invention consists of an elongated cylindrical shaped snubber actuating piston 44 having an axially extending annular surface 45 mounted for sliding movement on the pin 26. The piston 44 is countersunk to form a shoulder 46 intermediate of the ends of the piston 44. An axially extending annular innerwall 47 bears against the radially outer surface of the bearing 37. An annular seal 48 is positioned within the annular chamber 49 defined by the shoulder 46, surface 47 and the end wall 50 of the bearing 37. The seal 48 seals the surfaces of the bearing 37 with the surface 47 of the piston and the piston surface 45. A seal 51 seals the piston surface 45 with the pin 26. Preferably, the end 52 of the snubber piston 44 extends to a position slightly beyond the pin end 36.

The annular chamber 49 is pressurized by grease injected therein through bore 55 extending radially through the pin end 36 and terminating at the base of a grease gun fitting 53 having a suitable check valve. Preferably, the fitting 53 is positioned in a counterbore 54 formed in the end 36 of pin 26 to protect the fitting from damage.

In operation, when grease pressure is applied within the chamber 49 by use of a grease gun, typically used to lubricate the bearings 37 by means not shown, a snubbing or braking effort on the snubbing apparatus is created. As pressure is applied through the bore 55 into the chamber 49, the snubber piston 44 is initially moved axially toward the right, as viewed in FIG. 3, to force the brake pad retainers 42 toward the brake pads 40 against the bias of the Bellville spring washers 43. Thus, the frictional drag between the brake pads and the retainers caused by the axial movement of the snubber piston 44 retards the rotation or swing of the arms 28 and 29 relative to the bidirectional pivot member 17. The braking or retarding force is essentially proportional to the amount of grease pressure applied to the annular chamber 49 so that the amount of dampening or snubbing may be adjustable. Since the grease pressure is sealed in the cavity or chamber 49 between the seals 48 and 51 the pressure will remain essentially constant and decrease only in proportion to the amount of grease which may bypass the seals.

I claim:

1. A snubber for a bidirectional pivot apparatus for suspending a load comprising a bidirectional pivot member for supporting a pair of pins at right angles to each other, a pin extending through said bidirectional pivot member, a yoke having spaced arms mounted on said pin, snubber brake means positioned between said member and each of said arms and means for preventing said pin from moving axially relatively to said arms, the improvement comprising an elongated cylindrical snubber piston slidably mounted on said pin to actuate said snubber brake means, bearing means mounted on said pin supporting said cylindrical piston, said piston and bearing means forming a chamber with said pin and means to pressurize said chamber with a fluid.

2. A snubber as claimed in claim 1 in which said chamber is defined by said pin, a shoulder formed in said piston and said bearing means.

3. A snubber as claimed in claim 1 in which said bearing means includes an annular bearing mounted on the end of said pin, said bearing having a radial outermost surface on which said snubber piston slides and a radially extending surface defining a portion of said chamber.

4. A snubber as claimed in claim 3 in which said piston includes a shoulder which defines a portion of said chamber.

5. A snubber as claimed in claim 4 in which said shoulder is formed by an axial counterbore extending partially through said piston.

6. A snubber as claimed in claim 1 in which an annular seal is mounted in said chamber.

7. A snubber for a bidirectional pivot apparatus for suspending a load comprising a bidirectional pivot member for supporting a pair of pins at right angles to each other, a pin extending through said bidirectional pivot member, a yoke having spaced arms mounted on said pin, snubber brake means positioned between said member and each of said arms and means for preventing said pin from moving axially relatively to said arms, the improvement comprising an elongated cylindrical snubber piston and a bearing means supporting said cylindrical piston forming a chamber with said pin to actuate said snubber brake means, a means of pressurizing said chamber with a fluid including a grease fitting mounted on the end of said pin and a bore extending from said grease fitting to said chamber.

8. A snubber as claimed in claim 7 in which said grease fitting is mounted in a counterbore located in the end of said pin.

* * * * *